May 22, 1956 — R. C. SWENGEL — 2,746,291

FLUID VELOCITY MEASURING SYSTEM

Filed Sept. 8, 1950 — 2 Sheets-Sheet 1

INVENTOR.
ROBERT C. SWENGEL
BY Curtis, Morris & Safford.
ATTORNEYS.

May 22, 1956 R. C. SWENGEL 2,746,291
FLUID VELOCITY MEASURING SYSTEM
Filed Sept. 8, 1950 2 Sheets-Sheet 2
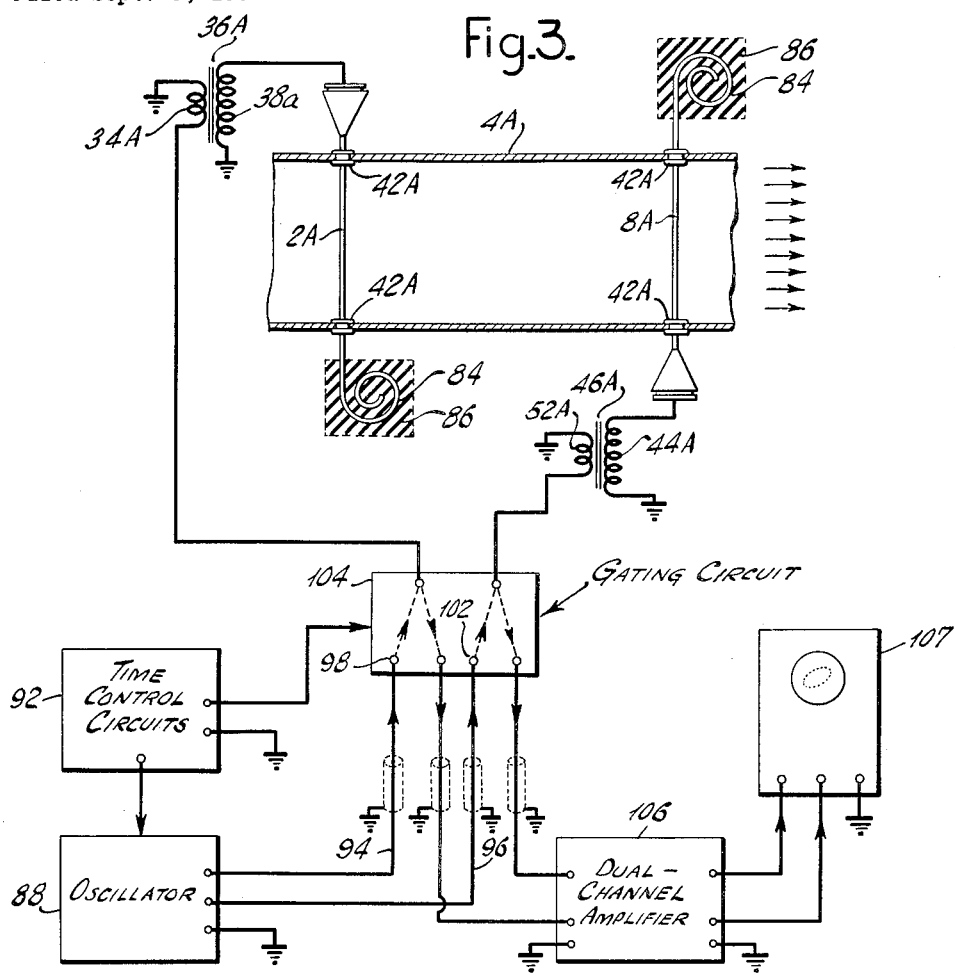
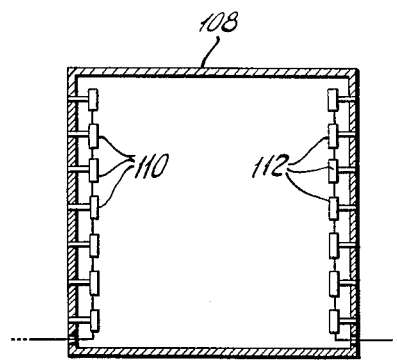
INVENTOR.
ROBERT C. SWENGEL
BY
Curtis, Morris & Safford.
ATTORNEYS.

United States Patent Office 2,746,291
Patented May 22, 1956

2,746,291

FLUID VELOCITY MEASURING SYSTEM

Robert C. Swengel, York, Pa.

Application September 8, 1950, Serial No. 183,753

16 Claims. (Cl. 73—194)

This invention relates to the measurement of the velocity of a fluid in a conduit. It is especially adapted for measuring the rate of flow of homogeneous liquids in large diameter conduits.

In this invention, use is made of the principle that the measured velocity of propagation of a compression wave in a moving medium is a function not only of the propagation velocity of the wave in that medium while at rest, but also depends on the flow velocity of the medium, the propagation velocity of a wave in a downstream direction being increased by an amount equal to the velocity of the moving fluid, and the propagation velocity of a wave traveling upstream being decreased by a corresponding amount. Devices based on this principle have been proposed heretofore but, in practice, have been so inaccurate that they have not been generally accepted for velocity measurements. For example, errors are frequently introduced by uncalculated reflections of the waves from the walls of the conduit or from obstructions within the fluid. Still more serious errors are introduced when the rate of flow is non-uniform over the cross-section of the conduit. If the velocity is determined along a single line path across this section, the indicated velocity may be very different from the true average velocity of all of the fluid in the conduit. Further errors may be caused by conduction of the compressional waves from the transmitter to the receiver through the walls of the conduit. Thus, the earlier systems have not been acceptable in practice because of the erratic and unreliable indications, and in addition, because the proposed arrangements usually required expensive and cumbersome calibration equipment.

It is a foremost object of the present invention to so reduce the aforementioned errors that reliable and accurate indications of flow are obtained. Another object of the invention is to obtain an accurate indication of the average rate of flow throughout the cross-section of the conduit. Still another object is to eliminate the necessity for calibration in a still medium. Another object is to reduce the effects of temperature and other unstable parameters.

In one embodiment of the invention, a constant frequency compression wave is transmitted through a moving homogeneous fluid medium between a transmitter and receiver spaced along and on opposite sides of the conduit. The transmitter and receiver are arranged so that their functions can be rapidly interchanged, the transmitter becoming the receiver and the receiver taking over the transmitting function. Thus, the waves which measure the flow velocity are transmitted alternately upstream and downstream so that by combining the two transit time measurements, the effects of certain variables are minimized, and the need for calibration under "no-flow" conditions is eliminated. The invention contemplates means for interchanging the functions with such rapidity that temperature or other variations occurring in the interval between the two measurements will not be of such magnitude as to interfere with the accuracy of the flow determination. Although the transit time itself can be directly or indirectly measured by a number of known techniques, I prefer to determine it by phase displacement measurements and to correlate these measurements with fluid velocity.

Previous measurement systems have utilized transmitting and receiving elements which, respectively, radiated waves from a point, or relatively concentrated area, and responded to waves incident on a similar point or concentrated area. Such systems cannot measure the true average velocity of the fluid throughout the cross section of the conduit where the flow is non-uniform, a condition usually encountered in practice.

The present invention provides for the simultaneous emission of waves from a number of distributed points and the reception of energy at correspondingly distributed points at another location in the conduit. In one embodiment of the invention, slender probes, serving as both radiators and receptors, are located near opposite walls of the conduit and displaced a known distance along the length of the conduit.

These probes are selected to produce a substantially uniform energy pattern over the cross-section of the conduit. The average linear flow of a fluid in a conduit is made up of individual local linear velocities as the distance from one conduit wall to another is traversed, and these linear radiators or probes permit the measurement of propagation velocities which are a true indication of the integrated effect of these local velocities, so that errors are not introduced by local disturbances such as non-uniform linear velocity.

A further feature of this invention lies in the arrangement and positioning of the transducers in the conduit, so that each probe, when acting as a receiver, "sees" only waves which are transmitted through the fluid and does not respond efficiently to waves reflected from points up or down the conduit outside the limits of the probe positions, or to waves conducted through the walls of the conduit. Another feature relates to the positioning of the probes so that the receiving probe "sees" a wave pattern of uniform intensity despite non-uniform radiation characteristics.

Other features, advantages, and objects of the invention will be in part pointed out in, and in part apparent from, the following description considered in conjunction with the following drawings, in which:

Figure 3 is a block diagram of a modified measuring system; and

Figure 4 is a sectional view representing diagrammatically the use of a plurality of transmitting and receiving transducers.

Under a first condition of operation, compressional waves are radiated throughout the length of a probe, generally indicated at 2 (Figures 1 and 2), that extends vertically across a conduit 4, which carries a liquid flowing in the direction indicated by the arrows 6. These waves travel downstream and across the conduit and are received by a similar probe, generally indicated at 8. It will be noted that the "wave-portions" impinging on probe 8 have traversed every portion of the cross-section of the conduit 4, so that by comparing the phase displacement of the transmitted and received waves to determine the transit time, any differences in rate of flow at various points in the conduit are automatically taken into account. As soon as the above measurement is completed, the functions of the two probes 2 and 8 are interchanged, for example, by means of a reversing switch, generally indicated at 12, and the measuring process repeated, this time with the compressional waves traveling upstream.

Figure 2:
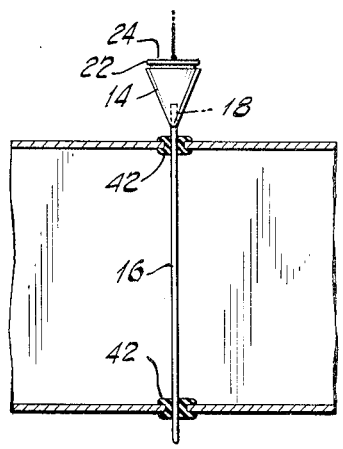
Figure 2 is an enlarged cross-sectional view of one of the probes shown in Figure 1.

As shown best in Figure 2, the probe 2 includes a conically-shaped head 14 and a slender wire-like extension 16, both formed of steel or other suitable material. The extension 16 can be secured to the head 14, for example, by press-fitting as indicated at 18.

In order to produce the compressional waves in the probe 2, a piezo-electric crystal 22, of quartz or ceramic material (see for example Electronics magazine for July 1948, page 128, and December 1948, page 94), is secured to the upper surface of the head 14 by a layer of resilient adhesive material such as Canada balsam. Electrical connection to the crystal is made by means of an upper electrode 24, formed, for example, by a layer of silver plated directly on the surface of the crystal, the connection to the opposite crystal surface being made through the capacity coupling to the common ground circuit. The length of the probe is such that it is mechanically resonant at the desired frequency of operation. In practice, the probes are cut to a length approximating the calculated length, and, if necessary, the frequency of the energy source can then be adjusted to produce the desired radiation characteristics. The crystal driving element is placed against the end of the probe and is caused to vibrate by means of electrical signals applied to the crystal and this causes compressional waves to be produced along the probe. The longitudinal waves generated travel along the length of the probe and are reflected from the end back toward the source. If the rod is some multiple of a half wave length long, standing waves will be created along its length. These standing waves cause the rod to expand and contract at half wave length intervals along its length. These points of expansion and contraction can be considered isotropic sources.

Other means can be utilized to excite the probes 2 and 8. For example, electromagnetic driving systems can be employed, or the probes can be excited by magnetostrictive effects. However, for the frequencies usually employed, the excitation is most readily obtained by piezo-electric effect.

The ultrasonic waves utilized in the velocity measurements are produced by means of an oscillator, indicated in block form at 26, which may be of any known type, but which should have high frequency stability and preferably should be tunable in frequency at least over a limited frequency range. The signal from the oscillator is fed by a lead 28, which in practice may be a coaxial cable or other suitable conducting means, to the switch 12. The switch 12 is for the purpose of interchanging the connections to the probes 2 and 8 and is indicated diagrammatically as a double-pole, double-throw switch. It is, of course, important to prevent intercoupling between the transmitting and receiving circuits, and the switch 12 and other components should be designed and positioned to prevent such coupling. The switch 12, for example, may be a well shielded coaxial type switch, several types of which are commercially available.

Figure 1:
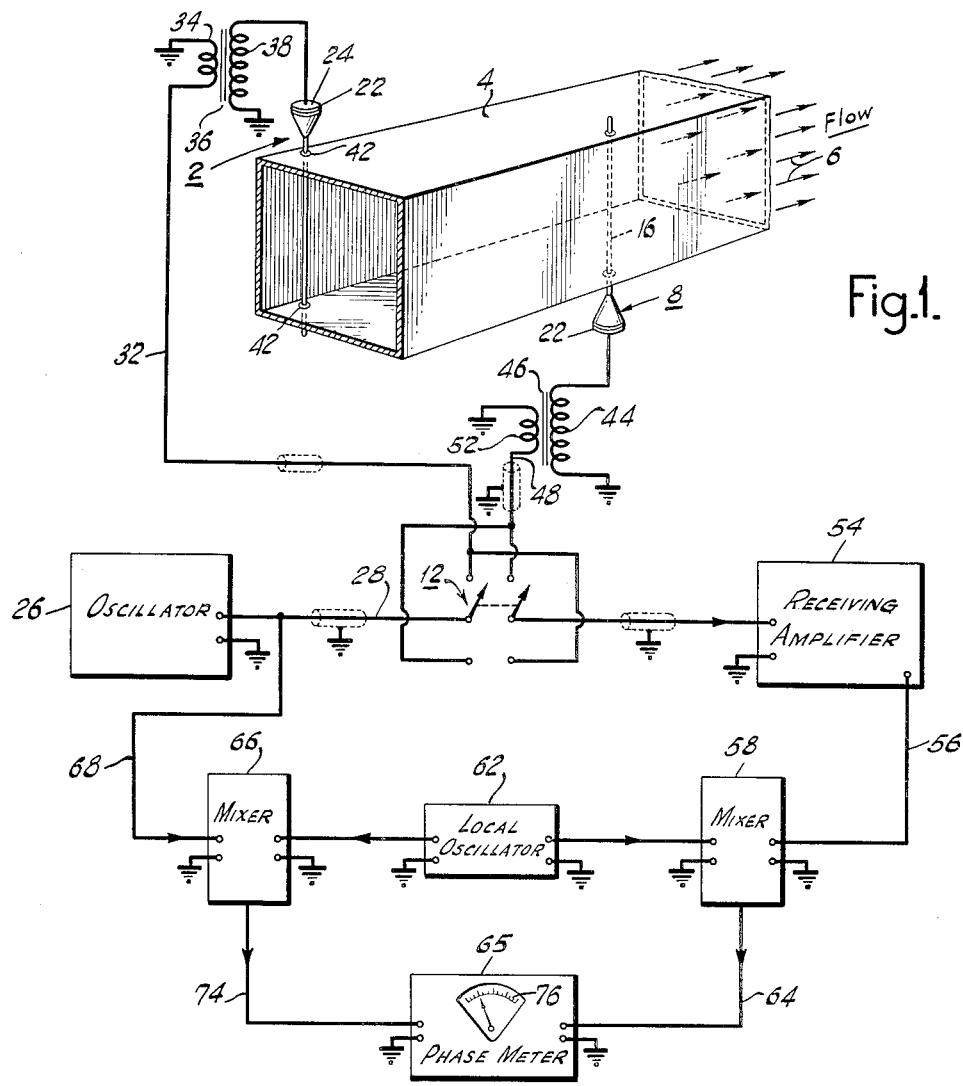
Figure 1 is a block diagram of a velocity measuring system embodying the invention.

With the switch 12 in the upper position, as indicated in Figure 1, the oscillator lead 28 is coupled to a transmission line 32 which is connected through the primary winding 34 of an impedance matching transformer 36 to ground. The secondary winding 38 of this transformer is connected to the common ground circuit and to the crystal electrode 24 of the crystal 22. This transformer preferably is positioned near the probe 2 and is designed to match the impedance of the line 32, which may be a coaxial cable of conventional design, to the crystal 22.

The probe 2 extends through an opening in the upper wall of the conduit 4 near one of the side walls, downwardly through the fluid in the conduit, and out through the bottom wall of the conduit. At each point where the probe passes through one of the walls of the conduit, the probe is surrounded by a ring 42 of sound absorbent material such as rubber or the like, which seals the opening and prevents the transmission of the compressional waves between the probe 2 and the walls of the conduit 4.

If the conduit is sufficiently large, the end of the probe opposite the driven or receiving end can be terminated in an acoustically absorbent well, so that it is unnecessary for the probe to pass through the wall of the conduit. Under certain circumstances, where the conduit is large enough, the driven end of the probe can be located in a recess in the wall, the driving mechanism being enclosed so that the liquid will not interfere with its proper operation.

Thus, when the oscillator 26 is energized, mechanical vibrations are produced by the crystal 22 which excite the extension 16 of the probe 2 and generate compressional waves in the fluid of the conduit 4 along the entire length of the probe 2 that is within the conduit 4. These waves travel through the liquid and strike the probe 8, which in this example is identical with the probe 2, and produce corresponding vibrations in the probe 8 which are converted by its crystal 22 at the end of the probe into corresponding electrical waves. The probe 8 is positioned downstream from the probe 2 and extends vertically through the conduit 4 near the wall opposite probe 2.

The probe 2 being excited at one end, it is evident that the losses in the probe will result in decreasing radiation energy along the length of the probe from the crystal to the opposite end. The effects which would otherwise be caused by this lack of uniform radiating characteristic are overcome by inverting the receiving probe 8 relative to the transmitting probe 2. Thus, as shown in Figure 1, the head of probe 8 is mounted beneath the conduit 4 so that its extension 16 extends upwardly through the conduit 4.

The crystal of probe 8 is connected to one end of a secondary winding 44 of an impedance matching transformer 46, the opposite end of this winding being connected to the common ground circuit. This transformer is identical with the transformer 36 and matches the impedance of the crystal of probe 8 to the impedance of a transmission line 48 which is connected to one end of the secondary winding 52 of the transformer 46, the opposite end of this winding being connected to the ground circuit.

The transmission line 48 is connected, with the switch 12 in the position indicated above, to an amplifier, indicated in block form at 54, which may be of conventional type and which preferably is tuned to the frequency of oscillator 26.

It is desirable for reasons of accuracy to utilize waves in the ultrasonic range for transmission through the fluid within the conduit 4, but it is relatively difficult to determine directly the phase of these high frequency signals received at amplifier 54 relative to the signals delivered by oscillator 26, which is a measure of the transit time of the waves traversing the fluid from probe 2 to probe 8. For this reason, the frequency of the ultrasonic signals may be reduced before the phase measurements are made. The signals delivered by amplifier 54 are coupled by a lead 56 to a conventional mixer, indicated in block form at 58. This mixer is supplied also with a signal from a local oscillator, indicated in block form at 62, which produces a stable signal that is different from the signal produced by oscillator 26 by a frequency within the audio frequency range. Thus, when the signals from the amplifier 54 and the local oscillator 62 are combined by the mixer 58, the resulting audio signal, which is the difference between the frequency of the local oscillator and the signal from the amplifier 54, is fed by a lead 64 to one terminal of the phase meter 65.

The comparison signal is produced by a second mixer, indicated in block form at 66. Signals from the primary oscillator 26 are fed to this mixer 66 by a lead 68, where they are mixed with signals from the local oscillator 62. The difference signal produced by the mixer 66 is fed by a lead 74 to the phase meter 65, which indicates on a scale 76 the phase difference between the two signals. It is to be understood that the phase comparison method is shown only as one example, and that any known method of determining the instantaneous difference between the two sinusoidal voltages or currents in either angular degrees or time can be employed.

When the switch 12 is moved from its upper to its lower position, referring to the physical relationship of the components indicated diagrammatically in Figure 1, the oscillator lead 28 is connected through the transmission line 48 to the probe 8, which now becomes the transmitting probe, and the probe 2, which now becomes the receiving probe, is connected to the receiving amplifier 54.

Thus, by means of the reversing switch 12 the signals can be transmitted first upstream and then downstream so that two phase readings can be obtained. Moreover, these readings can be made in rapid succession so that temperature or other conditions will not change appreciably during the time between the successive readings.

The flow velocity can be calculated from the following formula:

$$Va = \left( \frac{\frac{V^2}{D \cdot F} \cdot \frac{\Delta°}{360°}}{2} \right)$$

where "$Va$" is the velocity of the fluid in feet per second, "$V$" is the speed of sound in feet per second in the fluid under the conditions of measurement, "$D$" is the spacing in feet of the probes 2 and 8 along the direction of flow, "$\Delta°$" is the difference in degrees between the two phase angle measurements, and "$F$" is the frequency in cycles per second of the signal generated by the oscillator 26.

It is desirable that the extension 16 of the probe be sufficiently slender that a relatively uniform radiation pattern is obtained. In one practical system utilizing an oscillator frequency of 500 kilocycles a probe having the following dimensions gave satisfactory results. The maximum diameter of the head 14 was 1.25 inches, the over-all length of the head was 1.5 inches, the extension 16 was recessed into the head portion a distance of 0.5 inch and was press-fitted therein, and the diameter of the extension 16 was 0.105 inch. The entire head was constructed of steel.

If desired, pulse techniques can be used in making the velocity measurements and such a system is indicated diagrammatically in Figure 3, in which certain components similar to those of the system shown in Figure 1 are designated by like numbers followed by the suffix "A."

Two probes 2A and 8A are positioned in a conduit 4A in substantially the same relative positions as the probes 2 and 8 of Figure 1. The probes and the driving elements therefor are substantially the same as the ones described above, but in this example are terminated in acoustically absorbent material to prevent reflections from the ends of the probes. Thus, the probe 2A is substantially longer than is necessary to traverse the conduit 4A, and the excess length, as at 84, is coiled to conserve space and is embedded in butyl rubber 86 or other suitably absorbent material. The probe 8A is similarly terminated.

A pulsed oscillator 88, which is regulated by time control circuits, indicated in block form at 92, delivers short pulses of high frequency energy at periodic intervals. This oscillator is arranged to provide simultaneously two separate output signals, which are coupled respectively through coaxial leads 94 and 96, to terminals 98 and 102 of an electronic switching or gating circuit, indicated in block form at 104. The time control circuits 92 preferably are arranged to control the oscillator 88 so as to deliver pulses of controllable duration and spacing.

The gating circuit 104, which is also controlled by the timing circuits 92, is arranged to couple the pulses from lines 94 and 96 to the probes 2A and 8A, respectively, so that both probes are energized simultaneously.

As in the preceding embodiment, the probes produce corresponding mechanical vibrations in the liquid flowing through the conduit, the pulse of high frequency energy from the probe 2A traveling downstream to the probe 8A, and the energy from the probe 8A traveling upstream to the probe 2A.

At the termination of each transmitted pulse, the time control circuits 92 cause the gating circuit 104 to connect the probes 2A and 8A to the input circuits of a dual-channel amplifier, indicated in block form at 106, where the pulses received by the respective probes are amplified separately.

The rate of flow of the liquid in the conduit 4A is then determined by comparing the phase of the two received signals. This can be done, in known manner, by a cathode-ray oscilloscope, diagrammatically illustrated at 107, the vertical and horizontal deflection circuits of which are connected respectively to the two output circuits of the dual-channel amplifier 106.

The gating circuit 104 may be constructed in any desired manner and several different types of gating circuits are known which are suitable for the present application. The gating circuit may be formed as a unitary device or may be considered as two separate switches so long as both are operated by the time control circuits 92 to retain the proper synchronized relationship. For techniques useful in the construction of such gating circuits reference is made to the following publications: Ultra High Frequency Techniques by Brainerd, Koehler, Reich and Woodruff (D. Van Nostrand Co., Inc., 1942) see particularly pages 168 to 175; Ultrasonics by Benson Carlin (McGraw-Hill Book Co., Inc., 1949) see particularly page 197 and the pages following; Electronics (magazine published by McGraw-Hill Book Co.) for July 1948, pages 76 and 79, and April 1949, page 85; and Principles of Radar by members of the staff of the Radar School, Massachusetts Institute of Technology, second edition (McGraw-Hill Book Co., Inc., 1946) see pages 6–16 to 6–19.

It is, of course, important to prevent the conduction of the ultrasonic waves through the walls of the conduit, and the precautions which it is necessary to take will depend upon the particular installation, for example, upon the size and shape of the conduit and the material from which the walls are made. Improved results may be obtained by lining the walls of the conduit adjacent each of the probes with suitable sound absorbent material.

Although the described invention is primarily applicable to conduits of rectangular cross section, improved results are also obtained in conduits of other cross-sectional shapes, so long as the transducers can be arranged so that, as seen by the receiver, the total area of the conduit is covered by a uniform distribution of ultrasonic energy.

It is obvious that other transducers may be used to replace the probes 2 and 8, and which, although they do not have all of the advantages of the probes described above, can be successfully utilized in certain instances. For example, the entire probe may be constructed of piezo-electric ceramic material, thus producing a higher excitation efficiency. It is also possible to replace the linear transducer with a number of point radiators, for example, a group of crystals may be spaced along the position now occupied by the probe and each crystal individually excited, thus producing a number of radiating points to approximate the linear distribution of energy produced by the probes described above.

Figure 4 is an end view of a rectangular conduit 108 in which a number of reversible transducers 110 (transducers that can act either as receivers or transmitters) are mounted at spaced intervals along one wall of the conduit, and a second group of reversible transducers 112 is mounted in spaced alignment along the opposite wall and positioned either upstream or downstream from the first group of transducers 110.

The transducers 110 are connected in parallel, as are the transducers 112, and these parallel connections are coupled, for example, to apparatus such as is shown in either Figure 1 or Figure 3.

It is thus seen that I have provided a system for measuring the velocity of moving fluids that is well suited to the attainment of the ends and objects hereinbefore set forth, and in particular that I have provided a system which eliminates the need for calibration under "no-flow" conditions and which gives a highly accurate measure of flow even though the flow is non-uniform over the cross-section of the conduit.

The illustrated embodiments are subject to a wide variety of modifications, and certain features of the invention may sometimes be used to advantage without a corresponding use of other features. It is obvious, therefore, that the foregoing examples are for the purpose of illustration, so that others can modify and adapt the invention to a particular use, and not for the purpose of limitation.

What is claimed is:

1. In a system for measuring the flow of a fluid, apparatus comprising a first transducer communicating with said fluid, a second transducer communicating with said fluid and displaced along the path of said fluid from first transducer, energizing means for causing said first transducer to transmit compressional waves through said fluid, reception means responsive to signals from said second transducer produced by said waves impinging upon said second transducer, control means for interchanging the functions of said transducers whereby waves are transmitted by said second transducer and received by said first transducer, and means for measuring the difference in transit times of said waves when traveling through said fluid from said first to said second transducer and from second to said first transducer.

2. In a system for measuring the flow of a fluid, apparatus comprising a first reversible transducer communicating with said fluid, a second reversible transducer communicating with said fluid and displaced along the path of said fluid from first transducer, a signal generator connected to said first transducer and arranged to cause said first transducer to transmit compressional waves through said fluid, reception means connected to said second transducer and responsive to signals from said second transducer produced by said waves impinging upon said second transducer, switch means for rapidly interchanging the functions of said transducers whereby waves are transmitted by said second transducer and received by said first transducer, and means for measuring the transit times of said waves when traveling through said fluid from said first to said second transducer and from said second to said first transducer.

3. In a system for measuring the rate of flow of a fluid, apparatus comprising a first reversible transducer communicating with said fluid, a second reversible transducer communicating with said fluid and displaced along the path of said fluid from said first transducer, energizing means for causing said first transducer to transmit compressional waves through said liquid, reception means responsive to signals from said second transducer produced by said waves impinging upon said second transducer, a reversing switch for interchanging the functions of said transducers whereby waves are transmitted by said second transducer and received by said first transducer, and phase detection means for successively measuring the relative phase angles between the transmitted and received waves when traveling through said fluid from said first to said second transducer and from said second to said first transducer.

4. In a system for measuring the rate of flow of a fluid, apparatus comprising a first reversible linear transducer including a transducing element and a probe extension positioned in said fluid, a second reversible linear transducer including a crystal and a probe extension positioned in said fluid and displaced along the path of said fluid from first transducer, an ultrasonic generator connected to said first transducer and arranged to cause said first transducer to transmit compressional waves through said fluid, reception means connected to said second transducer and responsive to signals from said second transducer produced by said waves impinging upon said second transducer, a reversing switch for rapidly interchanging the functions of said transducers whereby waves are transmitted by said second transducer and received by said first transducer, phase detection means coupled to said reception means and to said generator for successively measuring the relative phase angles between the transmitted and received waves when traveling through said fluid from said first to said second transducer and from said second to said first transducer.

5. In a system for measuring the flow of fluid in a conduit, apparatus comprising a first transducer system positioned in said fluid and arranged to produce compressional waves at a plurality of spaced points, all of said points lying substantially along a straight line extending substantially transversely to the direction of flow of said fluid, a second transducer system positioned in said fluid and displaced along the path of said fluid from first transducer system and arranged to respond to compressional waves in said fluid at a plurality of spaced points lying along a second line substantially parallel with said first line, energizing means causing said first transducer system to transmit compressional waves through said fluid, reception means responsive to signals from said second transducer system produced by said waves impinging upon said second transducer system, and means for measuring the transit time of said waves when traveling through said fluid from said first to said second transducer system.

6. In a system for measuring the flow of fluid in a conduit, apparatus comprising a first transducer system positioned in said fluid and arranged to produce compressional waves at a plurality of spaced aligned points extending transversely to the direction of flow of said fluid, a second transducer system positioned in said fluid and displaced along the path of said fluid from said first transducer system and responsive to compressional waves in said fluid at a plurality of spaced aligned points extending substantially parallel with said spaced transmission points of said first transducer system, an ultrasonic generator for causing said first transducer system to transmit compressional waves through said fluid, reception means responsive to signals produced by said second transducer system as a result of the impingement thereon of compressional waves from said first transducer system, and phase measuring means coupled to said generator and to said second tranducer system.

7. In a measuring system, apparatus including means for producing compressional waves along a first line extending into a liquid substantially transversely to the direction of flow of said liquid, means for receiving compressional waves along a second line in said liquid extending substantially parallel to said first line and displaced therefrom, and measuring means connected to said producing and receiving means for measuring the average transit time of waves traveling through said liquid from said first to said second line.

8. In a system for making measurements in a body of moving fluid, apparatus comprising a first transducer including a linear radiating element positioned in said fluid and extending substantially across one dimension of the path of said fluid, a second transducer including a linear receiving element positioned in said fluid and displaced along the path of said fluid from first transducer and extending substantially parallel with said first transducer and across the path of said fluid, an oscillator for energizing said first transducer, receiving means responsive to signals from said second transducer produced by said waves impinging upon said second transducer, and means for measuring the transit time of waves produced by said first transducer and received by said second transducer.

9. In a system for measuring fluid flow, apparatus comprising a first transducer including a slender extension extending into said fluid transversely to the direction of flow of said fluid, a second transducer including a slender extension extending into said fluid and displaced along the path of said fluid from first transducer, said extensions of said first and second transducers lying along substantially parallel paths, energizing means for exciting said first transducer to transmit compressional waves through said fluid, receiving means responsive to signals from said second transducer produced by said waves impinging upon said second transducer, and means for measuring the transit time of waves produced by said first transducer and received by said second transducer.

10. In a system for making measurements in a fluid, apparatus comprising a first transducer including a piezo-electric element and a probe extension coupled to said element and extending into said fluid, a second transducer including a piezo-electric element and a probe extension coupled thereto and extending into said fluid substantially parallel with and displaced from said probe extension of said first transducer, energizing means for exciting said first transducer to transmit compressional waves through said fluid, receiving means responsive to signals from said second transducer produced by said waves impinging upon said second transducer, and means for measuring the transit time of waves produced by said first transducer and received by said second transducer.

11. In a system for measuring fluid flow, apparatus comprising a first transducer including a first probe extension extending into said fluid transverse to the direction of flow of said fluid, a second transducer including a second probe extension extending into said fluid and displaced along the path of said fluid from first said transducer, said second probe being substantially parallel with said first probe and extending in the opposite direction, energizing means for exciting said first transducer to transmit compressional waves through said fluid, receiving means responsive to signals from said second transducer produced by said waves impinging upon said second transducer, and means for measuring the transit time of waves produced by said first transducer and received by said second transducer.

12. In a system for measuring fluid flow, apparatus comprising a conduit having spaced opposed walls, a first transducer including a probe extension extending through one of said walls into said fluid, a second transducer including a probe extension extending substantially parallel with said probe extension of said first transducer through one of said walls into said fluid and displaced along the path of said fluid from first transducer, sound absorbing material interposed between each of said probes and the adjacent conduit walls at the points said probes pass through said walls, energizing means for exciting said first transducer to transmit compressional waves through said fluid, receiving means responsive to signals from said second transducer produced by said waves impinging upon said second transducer, and means for measuring the transit time of waves produced by said first transducer and received by said second transducer.

13. In a system for measuring the rate of flow of a fluid, apparatus comprising first and second reversible transducers extending into said fluid and displaced along the path of said fluid, an electrical pulse generator arranged to produce a series of spaced pulses of electrical energy, measuring means arranged to measure the difference in transit times of waves traveling through said fluid in opposite directions between said transducers connecting means arranged to couple signals from said generator to said transducers and from said transducers to said measuring means, and a gating circuit in said connecting means operated in synchronized relationship with said generator to couple said generator to said transducers during the generation of each of said pulses and thereafter to couple said measuring means to said transducers.

14. Apparatus as claimed in claim 1 wherein said energizing means is a source of successive electrical pulses and wherein said control means are arranged to couple said transducers to said energizing means during an interval of time when at least one of said pulses is produced and to couple said transducers to said reception means during intervals between said pulses.

15. Apparatus as claimed in claim 1 wherein said means for measuring difference in transit times of said waves includes means for measuring the phase angle between the two received waves.

16. In a system for measuring the flow of a fluid, apparatus comprising first and second transducers displaced along the path of said fluid and adapted for dual functions of converting wave energy in the fluid into electrical energy and of converting electrical energy into wave energy in the fluid, energizing means for causing said first transducer to transmit compressional waves through the fluid, reception means responsive to signals produced by waves impinging on said second transducer, control means for reversing the dual functions of said transducers whereby waves are transmitted by said second transducer and received by said first transducer, and means for determining the difference in transit times of said waves when traveling through said fluid from said first to said second transducer and from said second to said first transducer.

References Cited in the file of this patent

UNITED STATES PATENTS

| | | |
|---|---|---|
| Re. 17,357 | Cady | July 2, 1929 |
| 1,864,638 | Chilowsky | June 28, 1932 |
| 2,015,933 | Hartig | Oct. 1, 1935 |
| 2,044,807 | Noyes | June 23, 1936 |
| 2,064,911 | Hayes | Dec. 22, 1936 |
| 2,151,203 | Hartig | Mar. 21, 1939 |
| 2,274,262 | Wolff | Feb. 24, 1942 |
| 2,408,816 | Shapiro | Oct. 8, 1946 |
| 2,434,143 | Chilowsky | Jan. 6, 1948 |
| 2,503,831 | Mason | Apr. 11, 1950 |
| 2,514,080 | Mason | July 4, 1950 |
| 2,515,221 | Henning | July 18, 1950 |
| 2,534,712 | Gray | Dec. 19, 1950 |

FOREIGN PATENTS

| | | |
|---|---|---|
| 287,653 | Italy | July 31, 1931 |
| 623,022 | Great Britain | May 11, 1949 |
| 832,891 | France | July 11, 1938 |